United States Patent
Matsubara et al.

(10) Patent No.: US 12,454,208 B2
(45) Date of Patent: Oct. 28, 2025

(54) SEAT BACK TABLE

(71) Applicant: TOYOTA JIDOSHA KABUSHIKI KAISHA, Toyota (JP)

(72) Inventors: Norihiro Matsubara, Toyota (JP); Hiroharu Iizuka, Toyota (JP); Keisuke Toyota, Toyota (JP); Masaru Tsujiguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 18/134,672

(22) Filed: Apr. 14, 2023

(65) Prior Publication Data

US 2023/0331130 A1 Oct. 19, 2023

(30) Foreign Application Priority Data

Apr. 19, 2022 (JP) .................................. 2022-068885

(51) Int. Cl.
  *B60N 3/00* (2006.01)
  *B60N 3/10* (2006.01)

(52) U.S. Cl.
  CPC ............. *B60N 3/004* (2013.01); *B60N 3/103* (2013.01)

(58) Field of Classification Search
  CPC .................................. B60N 3/004; B60N 3/103
  See application file for complete search history.

(56) References Cited

U.S. PATENT DOCUMENTS

| | | | | |
|---|---|---|---|---|
| 2,173,569 A | * | 9/1939 | Troendle ................ | B60N 3/004 108/134 |
| 6,592,179 B1 | * | 7/2003 | Miyazaki .............. | G09F 21/049 297/146 |
| 2004/0239155 A1 | * | 12/2004 | Fourrey ................. | B60N 3/004 297/163 |
| 2014/0015289 A1 | * | 1/2014 | Fan ........................ | B60N 3/004 297/188.05 |
| 2017/0120839 A1 | * | 5/2017 | Harris .................... | B60N 3/004 |
| 2018/0065513 A1 | * | 3/2018 | Line ....................... | B60N 3/004 |
| 2023/0150412 A1 | * | 5/2023 | Fan ........................ | B60N 3/103 108/28 |
| 2023/0219688 A1 | * | 7/2023 | Lopez ................ | B64D 11/0638 297/124 |
| 2023/0312104 A1 | * | 10/2023 | Pajic ................ | B64D 11/00152 244/118.5 |

FOREIGN PATENT DOCUMENTS

| | | | | | |
|---|---|---|---|---|---|
| CN | 109334530 A | * | 2/2019 | ............ | B60N 3/004 |
| CN | 112498192 A | * | 3/2021 | ............... | B60N 2/22 |
| CN | 113715711 A | * | 11/2021 | | |
| CN | 113879194 A | * | 1/2022 | | |

(Continued)

Primary Examiner — Timothy J Brindley
(74) Attorney, Agent, or Firm — Dinsmore & Shohl LLP

(57) ABSTRACT

A seat back table attached to a rear surface of a seat back of an in-vehicle seat includes a base plate fixed to the rear surface of the seat back, and a table plate that is opened and closed by swinging with respect to the base plate, and, in this seat back table, a gap to which a fingertip can be inserted is provided between at least a portion of a peripheral edge of the base plate and the seat back, and at least the portion of the peripheral edge of the base plate functions as a grip portion that is capable of being gripped by a user.

2 Claims, 11 Drawing Sheets

(56) References Cited

FOREIGN PATENT DOCUMENTS

| | | | | | |
|---|---|---|---|---|---|
| CN | 115571031 | A | * | 1/2023 | |
| CN | 116788136 | A | * | 9/2023 | |
| CN | 117944554 | A | * | 4/2024 | ............ B60N 3/004 |
| DE | 102009043767 | A1 | * | 3/2011 | ............ B60N 3/004 |
| DE | 102014206125 | A1 | * | 10/2014 | ............ B60N 3/004 |
| DE | 102014207306 | A1 | * | 10/2015 | ............ B60N 3/004 |
| EP | 3269589 | A1 | * | 1/2018 | ............ B60N 2/753 |
| EP | 3594067 | A1 | * | 1/2020 | ............ B60N 3/002 |
| EP | 4253238 | A1 | * | 10/2023 | ............ B60N 3/004 |
| GB | 2473965 | A | * | 3/2011 | ............ B60N 3/004 |
| JP | 2009-046001 | | | 3/2009 | |
| JP | 2010111345 | A | * | 5/2010 | ............ B60N 3/004 |
| JP | 2017047901 | A | | 3/2017 | |
| JP | 2020175827 | A | * | 10/2020 | |
| KR | 20230147514 | A | * | 10/2023 | |
| WO | WO-2018060203 | A1 | * | 4/2018 | ............ A47B 31/06 |
| WO | WO-2021141577 | A1 | * | 7/2021 | ............ B60N 3/004 |

* cited by examiner

SEAT BACK TABLE

CROSS REFERENCE TO RELATED APPLICATION

This application claims priority to Japanese Patent Application No. 2022-068885 filed on Apr. 19, 2022, which is incorporated herein by reference in its entirety including the specification, claims, drawings, and abstract.

TECHNICAL FIELD

This specification discloses a seat back table fixed to a seat back of an in-vehicle seat.

BACKGROUND

Tables fixed to seat backs of in-vehicle seats, that is, so-called seat back tables, have been widely known. Most of these seat back tables function only as tables.

In order to improve occupant comfort, in addition to the table, an assist grip is also required so that an occupant can grip it by hand to support his or her body. Patent Document 1 discloses a bar-shaped assist grip attached to a seat back of a front seat. In Patent Document 1, speakers are provided at ends of this assist grip to further improve occupant comfort.

CITATION LIST

PATENT DOCUMENT 1: JP 2009-046001 A

The assist grip of Patent Document 1 is bar-shaped and suitable for being gripped by the user while the user is seated on a rear seat. In other words, it is difficult for the user to grip the assist grip of Patent Document 1 when he or she gets in and out of the vehicle. Further, as the assist grip of Patent Document 1 does not function as a table, a table needs to be provided separately from the assist grip according to necessity. However, it has been difficult to provide both the assist grip and the table, due to space and cost constraints. It therefore has been difficult to sufficiently improve occupant comfort with conventional technology.

In light of the above, this specification discloses a seat back table that can further improve occupant comfort.

SUMMARY

A seat back table disclosed in the present specification is a seat back table attached to a rear surface of a seat back of an in-vehicle seat, and the seat back table includes a base plate fixed to the rear surface of the seat back, and a table plate that is opened and closed by swinging with respect to the base plate. In this seat back table, a gap to which a fingertip can be inserted is provided between at least a portion of a peripheral edge of the base plate and the seat back, and at least the portion of the peripheral edge of the base plate functions as a grip portion that is capable of being gripped by a user.

This configuration makes it possible to provide both a table and an assist grip even in a small vehicle compartment and thus improve occupant comfort. This configuration also makes it possible for the occupant to grip the base plate from different directions, as the peripheral edge of the base plate is used as the grip portion. The occupant can therefore use the assist grip not only while the occupant is seated on the rear seat but also when the occupant gets in and out of the vehicle. Occupant comfort can thus be improved.

In this case, the base plate has a rounded rectangle shape with arc-shaped upper corner edges where an upper edge and side edges intersect, or a round shape, and at least the upper edge, the side edges, and the upper corner edges may function as the grip portion that is capable of being gripped by the user.

This configuration makes it possible for the occupant to grip the base plate more comfortably, because there are no sharp corners in the grip portion.

The seat back table also includes a hinge with a latching function, and the hinge swingably connects the table plate to the base plate and latches the table plate with respect to the base plate at an opening angle which is a predetermined latching angle. In this seat back table, the hinge with the latching function is capable of changing the latching angle in a stepwise manner or in a stepless manner.

This configuration makes it possible to change the latching angle of the table plate in response to changes in the backward tilt angle of the seat back. This then makes it possible to keep the table plate level even when the backward tilt angle of the seat back is changed.

In this case, the range within which the latching angle of the hinge with the latching function can be changed may be greater than the range within which the backward tilt angle of the seat back can be changed.

This configuration makes it possible to keep the table plate level even when the backward tilt angle of the seat back is changed significantly.

The seat back table may also include an adapter that is attachable and detachable with respect to the base plate and supports an object when attached to the base plate.

This configuration improves the convenience of the seat back table.

In this case, the base plate has, on a surface facing the table plate, a housing recess which is recessed in the direction of the plate thickness and to which the adapter is attached, and the housing recess may be large enough to fully accommodate the adapter.

This configuration makes it possible to close the table plate with the adapter attached. This then makes it possible to reduce the number of times the adapter needs to be attached and detached and thereby reduce the labor of the occupant.

The base plate has a rail groove elongated in the right and left direction in a part exposed when the table plate is opened, and the adapter may be coupled to any position in the rail groove.

This configuration makes it possible to change a position of the adapter along the right and left direction as desired.

The seat back table further includes a latch that keeps the table plate in a closed position, and the latch may be a magnetic latch that has a magnet that is provided on one of the base plate and the table plate and a magnetic body or another magnet that is provided on the other one of the base plate and the table plate and magnetically attracts the magnet.

This configuration makes it possible to release the latch by gripping the peripheral edge of the table plate and pulling it toward the near side. In other words, the occupant can open the table plate intuitively, as there is no need for a complicated operation to release the latch.

The seat back table further has a fixing portion that protrudes from the base plate toward the seat back and is fixed to the rear surface of the seat back. The fixing portion may have a recess on an upper surface.

This configuration makes it possible to place small items in the recess on the upper surface of the fixing portion. As the seat back is located immediately in front of the fixing portion, a thin plate-like item, such as a smartphone, placed in the recess can be leaned against the seat back. This makes it possible to improve the convenience of the seat back table.

The seat back table disclosed in the present specification can thus improve occupant comfort.

BRIEF DESCRIPTION OF DRAWINGS

An embodiment of the present disclosure will be described based on the following figures, wherein.

DESCRIPTION OF EMBODIMENT

Figure 1:
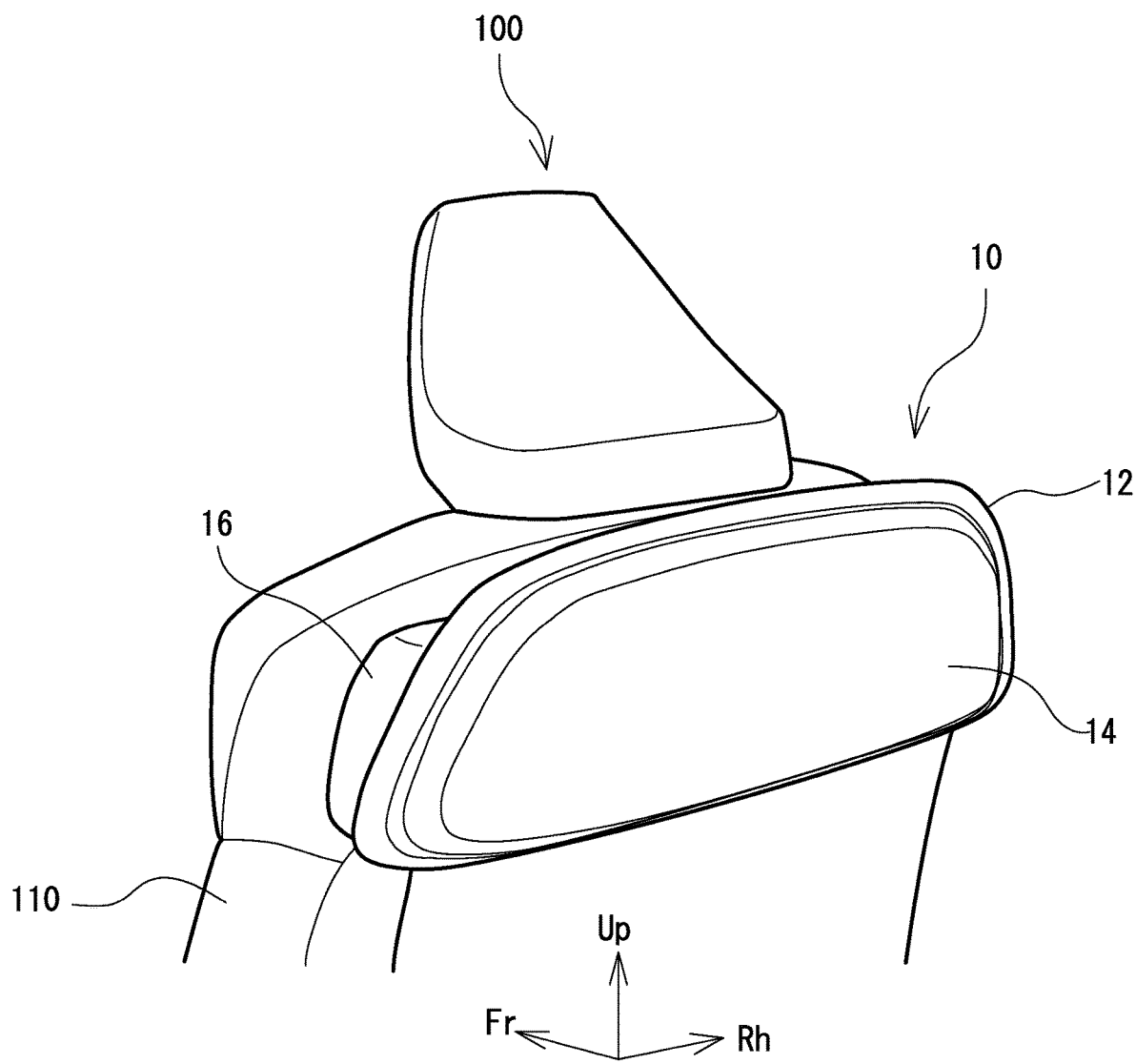
FIG. 1 is a perspective view of a seat back table in a closed state.
Figure 2:
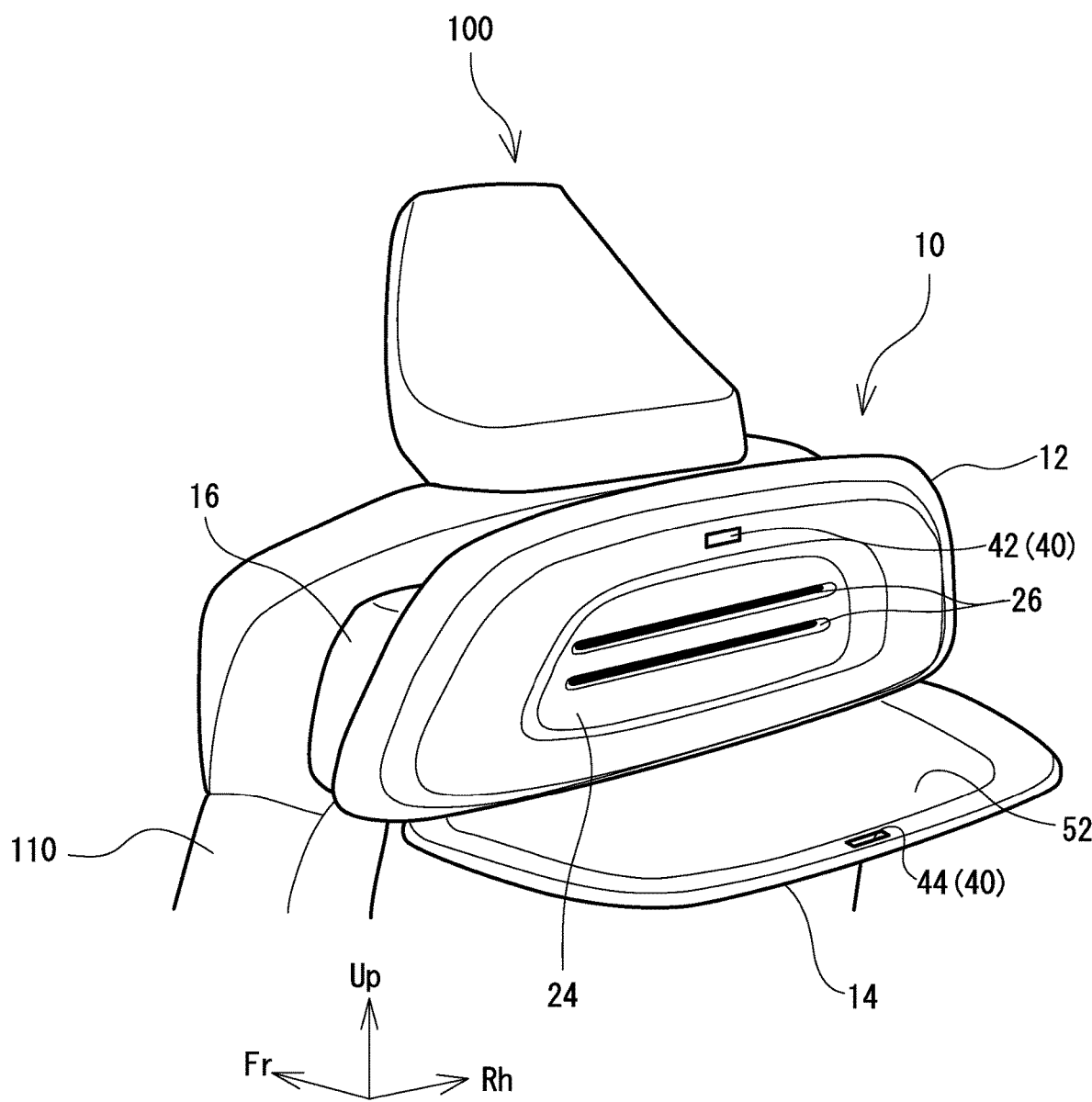
FIG. 2 is a perspective view of the seat back table in an open state.
Figure 3:
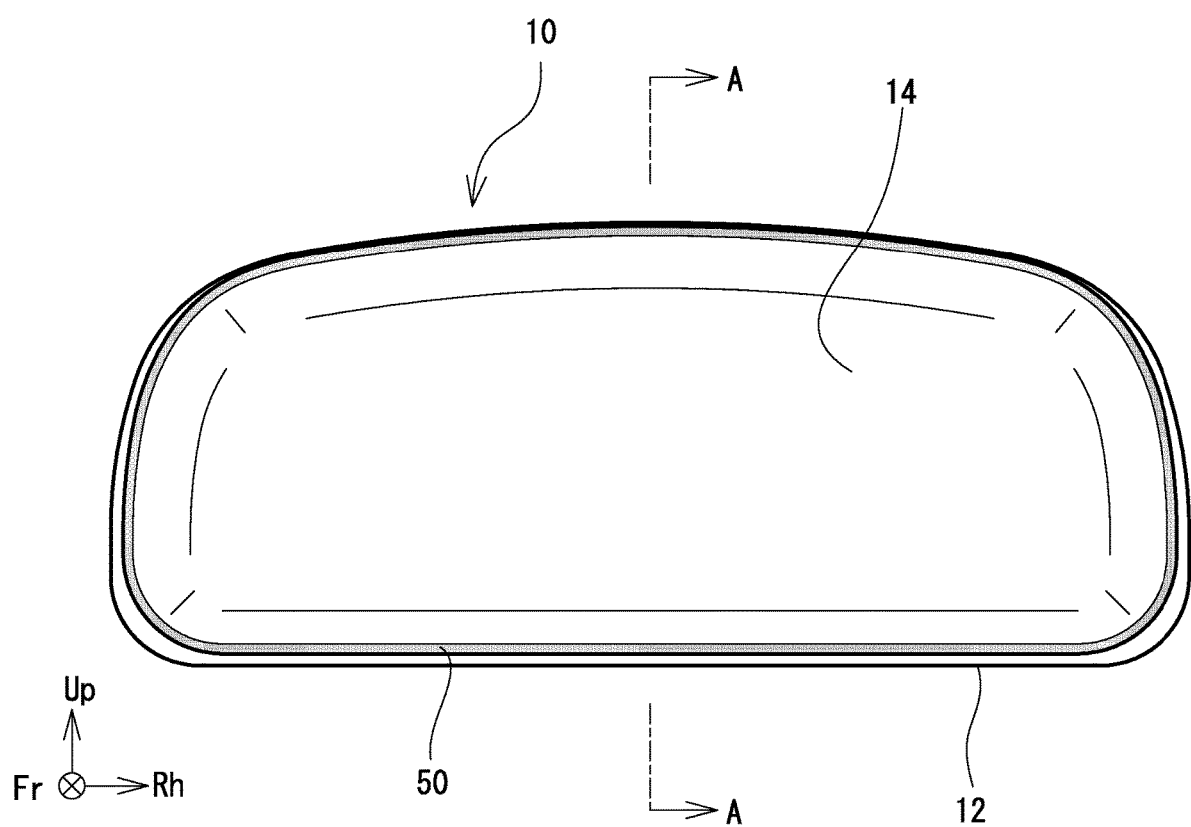
FIG. 3 is a rear view of the seat back table.
Figure 4:
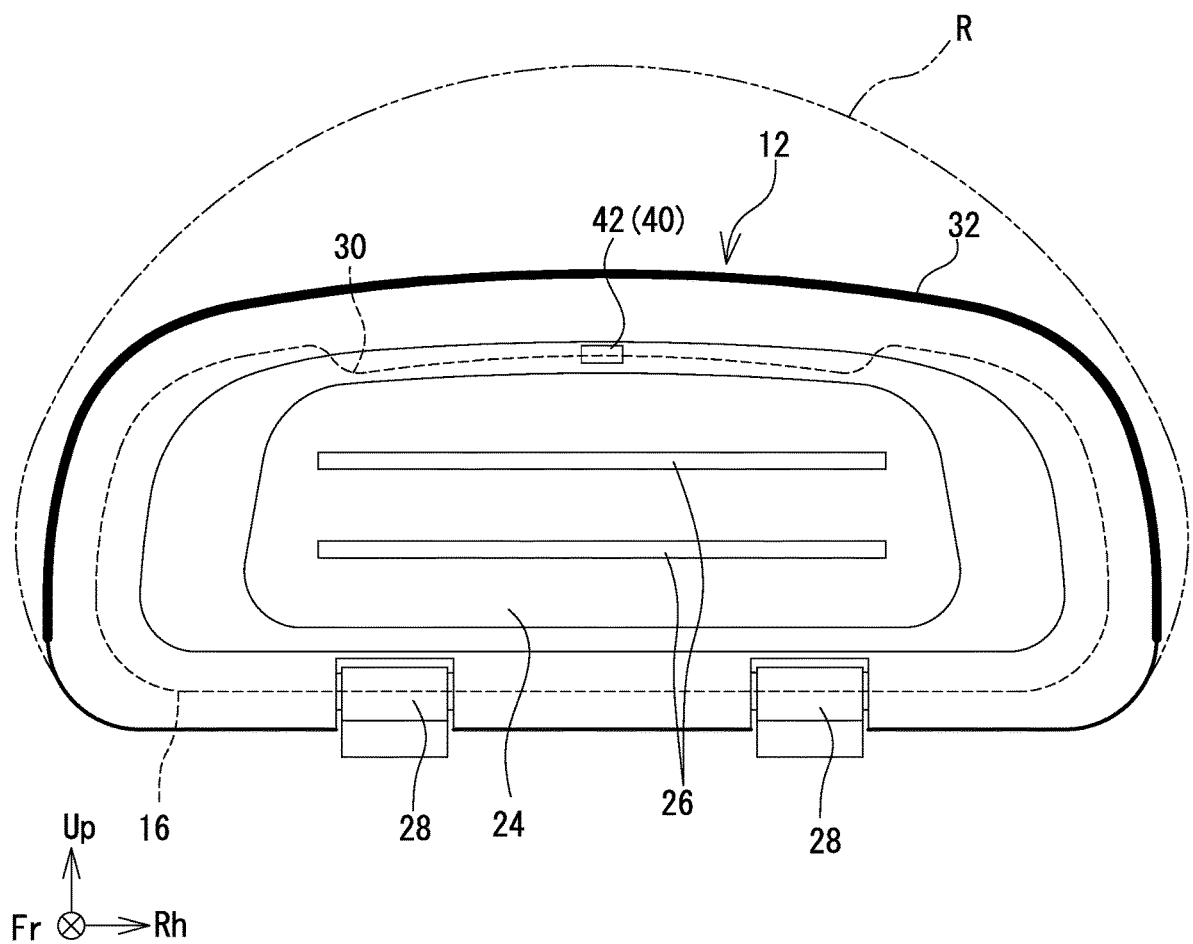
FIG. 4 shows the seat back table of FIG. 3 with a table plate removed.
Figure 5:
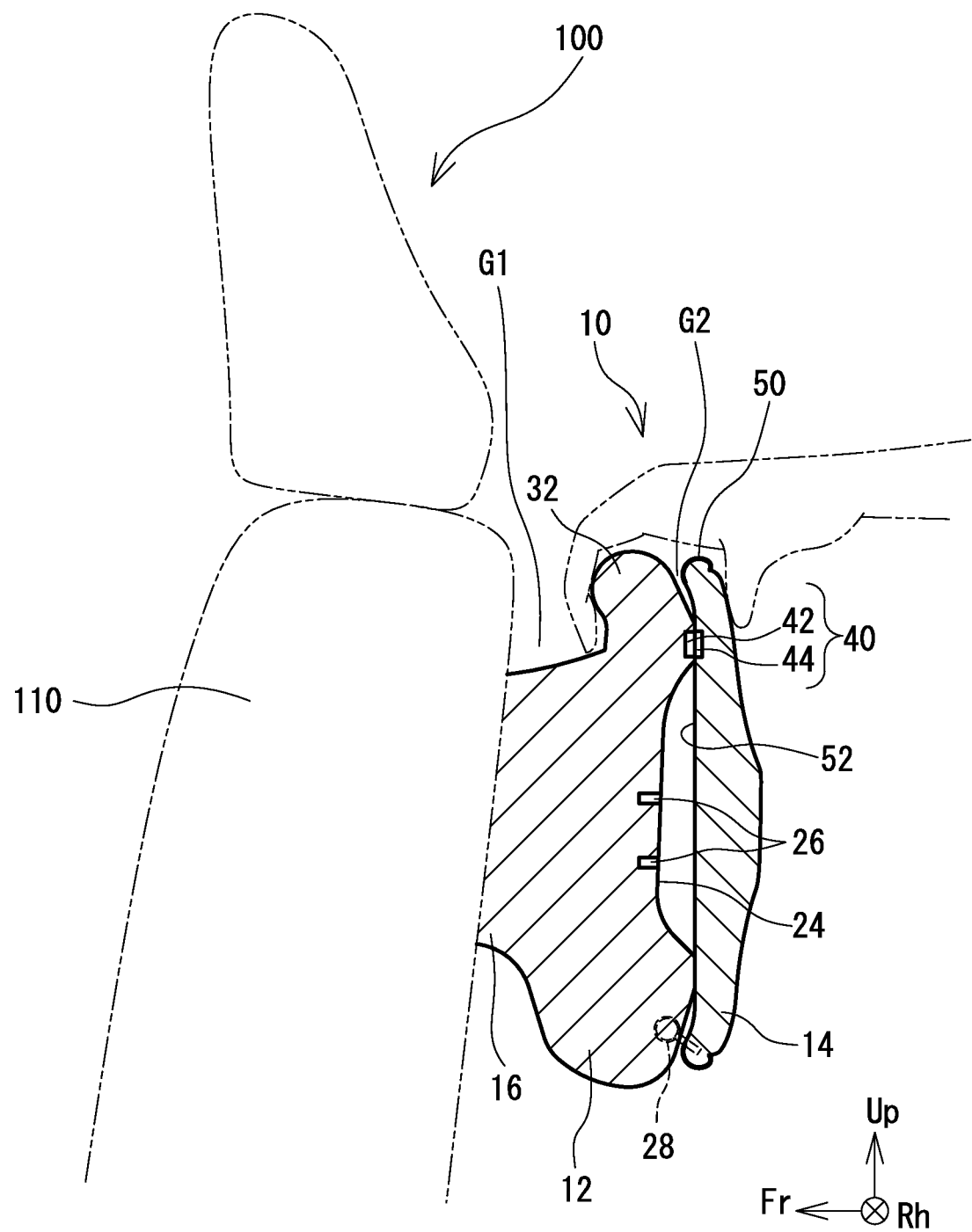
FIG. 5 is a cross-sectional view taken along line A-A in FIG. 3.

Hereinafter, a configuration of a seat back table 10 will be described with reference to the drawings. FIG. 1 is a perspective view of the seat back table 10 in a closed state, and FIG. 2 is a perspective view of the seat back table 10 in an open state. FIG. 3 is a rear view of the seat back table 10, and FIG. 4 shows the seat back table 10 of FIG. 3 with a table plate 14 removed. FIG. 5 is a cross-sectional view taken along line A-A in FIG. 3. The forward, backward, right, left, upward, and downward directions in the following description respectively refer to the forward, backward, right, left, upward, and downward directions as viewed from an occupant seated on an in-vehicle seat 100, unless otherwise noted. In addition, "Fr," "Rh," and "Up" in the figures respectively refer to the forward, right-hand side, and upward directions as viewed from the occupant seated on the in-vehicle seat 100.

The seat back table 10 is a table fixed to a seat back 110 of the in-vehicle seat 100 which is mounted in a vehicle. The seat back table 10 is primarily used by an occupant (hereinafter referred to as "user") seated on a rear seat (not shown) installed behind the in-vehicle seat 100. The in-vehicle seat 100 and the rear seat may be any seat mounted in the vehicle and are not limited to any particular type of seat. For example, the in-vehicle seat 100 is a driver's seat or a front passenger seat of a car, and the rear seat is a seat in the rear part of the car.

The seat back table 10 is roughly composed of a base plate 12, a fixing portion 16 for fixing the base plate 12 to the seat back 110, and a table plate 14 that can swing with respect to the base plate 12. The seat back table 10 can be changed between a "closed state" shown in FIGS. 1, 3, and 5 and an "open state" shown in FIG. 2. In the closed state, the table plate 14 is substantially parallel to the base plate 12 and overlaps the base plate 12 in the thickness direction. In the open state, the table plate 14 is substantially parallel to the horizontal direction and at a predetermined angle with respect to the base plate 12. Various items can be placed on an upward-facing surface of the table plate 14 (hereinafter referred to as "table surface 52") in the open state. The user can thus use the table plate 14 as a table when it is in the open state.

The seat back table 10 in this example also functions as an assist grip which the user can grip to support his or her body. When the user uses the seat back table 10 as the assist grip, the user grips a peripheral edge thereof. The configurations of the components of this seat back table 10 will be described below.

The base plate 12 is a plate-like member that is fixed in a posture substantially parallel to a rear surface of the seat back 110. The base plate 12 is positioned behind the seat back 110 with a gap G1 (see FIG. 5) from the rear surface of the seat back 110. The base plate 12 is a rounded rectangle with its upper and side edges connected by gentle arcs. In other words, the outer shape of the base plate 12 is rounded with no sharp corners.

As shown in FIGS. 2, 4, and 5, the base plate 12 has a housing recess 24 which is recessed in the direction of the plate thickness in the center of a rear surface of the base plate 12 (i.e., the surface facing the table plate 14). In this housing recess 24, two rail grooves 26 elongated in the right and left direction are formed so as to be spaced apart from each other in the vertical direction. Adapters 60 (described below) may be attached in these rail grooves 26. The housing recess 24 is large enough to fully accommodate the adapters 60, which will be discussed below.

The base plate 12 also has a magnet 42 that is a component of a magnetic latch 40 above the housing recess 24. The magnet 42 keeps the table plate 14 in the closed state by the magnetic attraction force generated between the magnet 42 and a magnetic body 44 on the table plate 14. The lower part of the base plate 12 has hinges 28 that support the table plate 14 in a swingable manner. The configuration of the hinges 28 will also be described in detail below.

As shown in FIGS. 1, 2, and 5, the fixing portion 16 protrudes from a front surface of the base plate 12 (i.e., the surface opposite to the table plate 14). The fixing portion 16 is a part that is fixed to the rear surface of the seat back 110. The mode of fixing the fixing portion 16 to the seat back 110 is not limited. Therefore, the fixing portion 16 may be fixed by using a fastening member, such as a bolt, or may be fixed by using an adhesive. In any case, the fixing portion 16 is firmly fixed to the seat back 110 so that it does not rattle even when it is pulled by the user. In this example, the fixing portion 16 is integrally molded with the base plate 12. However, as a matter of course, the fixing portion 16 may be a separate member from the base plate 12.

In FIG. 4, the outer shape of the fixing portion 16 is indicated by a broken line. As is clear from FIG. 4, the outer shape of the fixing portion 16 is one size smaller than that of the base plate 12. In particular, an upper edge of the fixing portion 16 is located several centimeters lower than that of the base plate 12, and side edges of the fixing portion 16 are located several centimeters inward from the side edges of the base plate 12 in the right and left direction. The thickness of the fixing portion 16 (i.e., the size in the front and rear direction) is also sufficiently larger than the thickness of the user's hand. This results in a gap G1 (see FIG. 5) equivalent to the thickness of the fixing portion 16 between the seat back 110 and the peripheral edge of the base plate 12, particularly, the upper edge, the side edges, and the upper corner edges of the base plate 12. This gap G1 is sized to receive a fingertip of the user when it is inserted. This gap G1 allows the user to grip the upper edge, the side edges, and the upper corner edges of the base plate 12 by hand. In other words, the upper edge, the side edges, and the upper corner edges of the base plate 12 serve as a grip portion 32 to be gripped by the user. The bold line in FIG. 4 indicates the peripheral edge area that serves as the grip portion 32. As shown in FIG. 5, the cross-sectional shape of the peripheral edge of the base plate 12, which is the grip portion 32, is substantially semicircular with a thickness that is easy to grip.

Further, as is clear from FIG. 4, the upper surface of the fixing portion 16 has an upper surface recess 30 that is recessed downward from the surrounding area. The user can use this upper surface recess 30 as an accessory holder for placing small items, such as a tablet.

The table plate 14 is a plate-like member having substantially the same outer shape as the base plate 12. The table plate 14 has a table surface 52 that is a surface facing the base plate 12 when the table plate 14 is in the closed state, and the greater part of the table surface 52 is flat with no irregularities. When the table plate 14 is in the open state, the table surface 52 is substantially parallel to the horizontal direction, and various items can thus be placed thereon.

The magnetic body 44, which is a component of the magnetic latch 40, is provided on the table surface 52 at a position that directly faces the magnet 42 when the table plate 14 is in the closed state. When the table plate 14 is closed, this magnetic body 44 and the magnet 42 are attracted to each other by magnetic force, and the closed state is maintained. As a matter of course, the positions of the magnet 42 and the magnetic body 44 may be reversed. That is, the magnetic body 44 may be provided on the base plate 12, and the magnet 42 may be provided on the table plate 14. Both the base plate 12 and the table plate 14 may have the magnets 42.

A peripheral edge of the table plate 14 is decorated with a metallic finish. A gray hatched area in FIG. 3 indicates a decorated portion 50 with the metallic finish. As shown in FIG. 5, the peripheral edge of the table plate 14; that is, the decorated portion 50, is circular in cross-section and forms a small gap G2 between the table plate 14 and the base plate 12. The user releases the magnetic latch 40 by hooking a fingertip in this gap G2 and pulling the table plate 14 to the near side.

As is clear from the above description, in this example, the upper edge, the side edges, and the upper corner edges of the base plate 12 serve as the grip portion 32 that can be gripped by the user. In other words, in this example, the seat back table 10 has a function not only as the table but also as the assist grip. Such a configuration allows provision of both the table and the assist grip in a small vehicle compartment to thereby improve the convenience for the user.

In addition, according to this example, the user can grip the base plate 12 from different directions and can thus use the grip section 32 in various situations. For example, when getting on and off the vehicle, the user can grip the upper corner edge or the side edge from the side of the base plate 12, so that the user can get on and off more safely. While the user is seated on the rear seat, the user can grip the upper edge of the base plate 12 from above to suppress the shaking of his or her body. The occupant's comfort in the vehicle can thus be further improved.

Figure 6A:
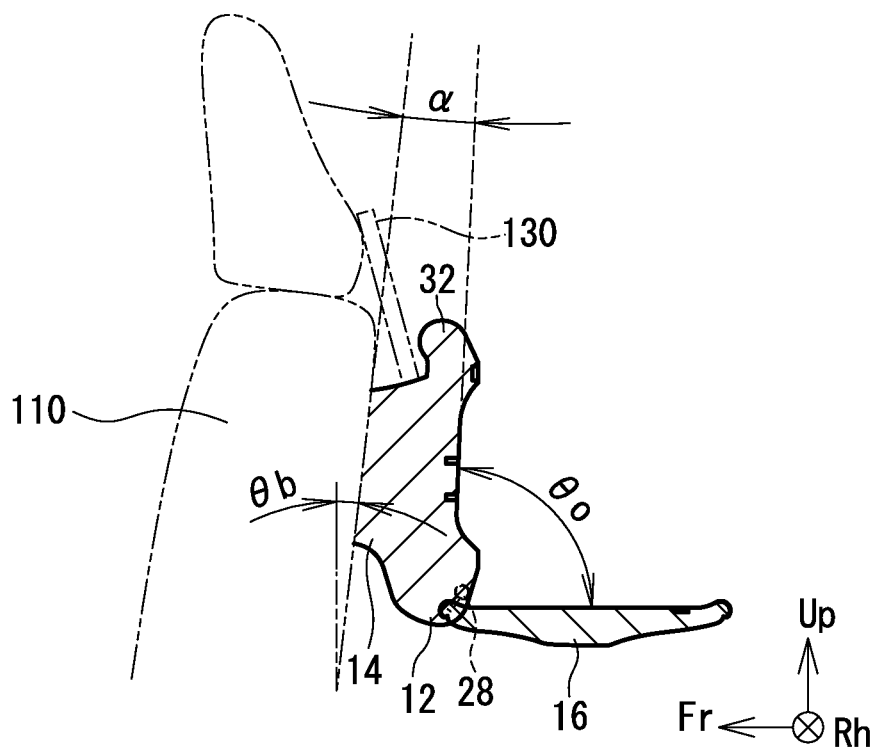
FIG. 6A is a cross-sectional view of the seat back table opened at a large opening angle.
Figure 6B:
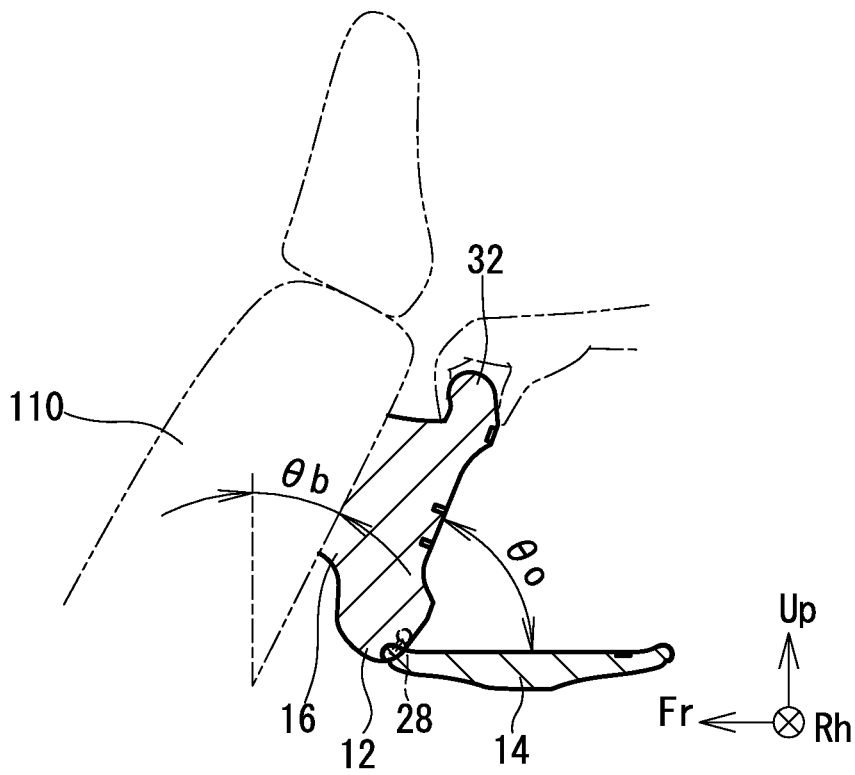
FIG. 6B is a cross-sectional view of the seat back table opened at a small opening angle.

When the seat back table 10 is in the closed state, the user grips the table plate 14 together with the base plate 12, as shown in FIG. 5. When the seat back table 10 is in the open state, the user grips the base plate 12 only, as shown in FIG. 6B. The base plate 12 and the table plate 14 are therefore thick enough to be properly gripped in both the open state and the closed state. The peripheral edges of the base plate 12 and the table plate 14 have a rounded cross-section, because sharp corners could hit the hand when gripped.

The gap G1 between the peripheral edge of the base plate 12 and the seat back 110 can also be used as a space for placing various small items. For example, as described above, in this example, the upper surface recess 30 is formed on the upper surface of the fixing portion 16. Small items can be placed in this upper surface recess 30. The seat back 110 is positioned immediately in front of the upper surface recess 30. Therefore, as shown in FIG. 6A, a plate-like item 130, such as a smartphone or tablet device, may be placed in the upper surface recess 30 so as to lean against the seat back 110. A stick-like item, such as an umbrella or cane, may also be inserted from the side into the gap between the side edge of the base plate 12 and the seat back 110 and leaned against the side of the fixing portion 16. In this case, the stick-like item is effectively prevented from falling down and remains stable in an upright position. Clothing, such as a jacket or a short coat, may also be hung on the peripheral edge of the base plate 12.

As described above, the table plate 14 can swing with respect to the base plate 12 by the hinges 28. These hinges 28 have a latching function of keeping the opening angle of the table plate 14 with respect to the base plate 12 at a predetermined latching angle. The latching angle can be changed stepwise or continuously. Such a hinge 28 can include, for example, a ratchet hinge capable of switching the latching angle stepwise, and a torque hinge capable of changing the latching angle continuously.

The reasons for using the hinges 28 that can change the opening angle θo for latching (i.e., the latching angle) will be described with reference to FIGS. 6A and 6B. As already described above, the seat back table 10 in this example is fixed to the seat back 110. Usually, the angle between the rear surface of the seat back 110 and the vertical direction (hereinafter referred to as "backward tilt angle θb") can be changed as desired within a certain range. Therefore, if the latching angle is kept constant, the table plate 14 may not remain level depending on the backward tilt angle θb of the seat back 110, and the items may thus not be placed stably.

On the other hand, in this example, the latching angle can be changed stepwise or continuously, as described above. This makes it possible to change the opening angle θo of the table plate 14 in response to changes in the backward tilt angle θb of the seat back 110. For example, the table plate 14 can be kept level by increasing the opening angle θo when the backward tilt angle θb is small as shown in FIG. 6A and by decreasing the opening angle θo when the backward tilt angle θb is large as shown in FIG. 6B.

In this case, the range within which the latching angle of the hinge 28 can be changed is greater than the range within which the backward tilt angle of seat back 110 can be changed. For example, when the backward tilt angle of the seat back 110 can be changed within the range of θb1 to θb2, the latching angle of the hinge 28 can be changed within the range of at least (90−θb1+α) to (90−θb2+α). The angle α is the angle formed between the rear surface of the seat back 110 and the base plate 12 and has a fixed value.

As described above, in this example, the magnetic latch 40 is used to keep the table plate 14 in the closed state. This makes it easier to open and close the table plate 14 and improves the convenience of the seat back table 10. Widely used latch mechanisms include a mating latch mechanism in which a pawl formed on one side is fitted into a hole formed on the other side, and an engaging latch mechanism in which an engaging member formed on one side is engaged with a part of the other side. However, these mating and engaging latch mechanisms require a specific operation at a specific point to release the latch. For example, in the case of the mating latch mechanism, it is necessary to press a part of the pawl with a finger to release the latch. Also, in the engaging latch mechanism, a specific member, such as a lever, needs to be operated to move the engaging member in the direction of disengagement to release the latch.

On the other hand, in the case of the magnetic latch 40, the latch is released when the table plate 14 is pulled in the open direction by a force greater than the magnetic attraction force. In this case, a position at which the pulling operation is performed is not particularly limited. In this example, the gap G2 where a fingertip can be hooked is formed between the base plate 12 and the decorated portion 50 on the peripheral edge of the table plate 14. By hooking the fingertip in this gap G2 and pulling the table plate 14, it is possible to release the latch and open the table plate 14. In other words, by using the magnetic latch 40, the peripheral edge of the table plate 14, particularly, the upper edge, the side edges, and the upper corner edges of the table plate 14, function as an opening operation portion that accepts the operation of opening the table plate 14. By allowing most of the peripheral edge of the table plate 14 to function as the opening operation portion in this way, the user can open the table plate 14 more intuitively, so that the convenience of the seat back table 10 is improved. Although the magnetic latch 40 is used in this example, as a matter of course, other latch mechanisms may also be used. For example, a latch mechanism by a hook-and-loop fastener, a latch mechanism by claw fitting, or an engaging latch mechanism may be adopted.

Figure 7:
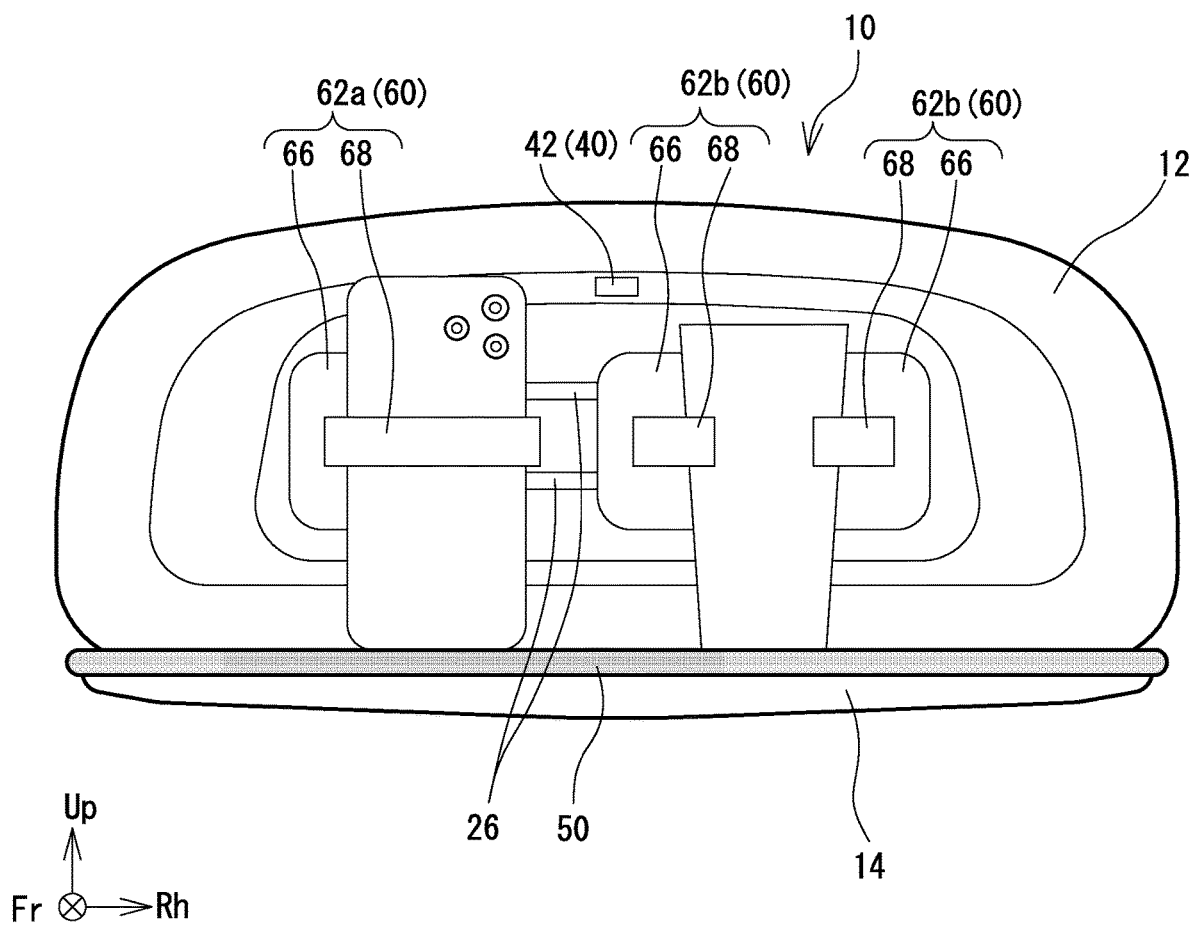
FIG. 7 is a rear view of the seat back table with adapters attached.
Figure 8:
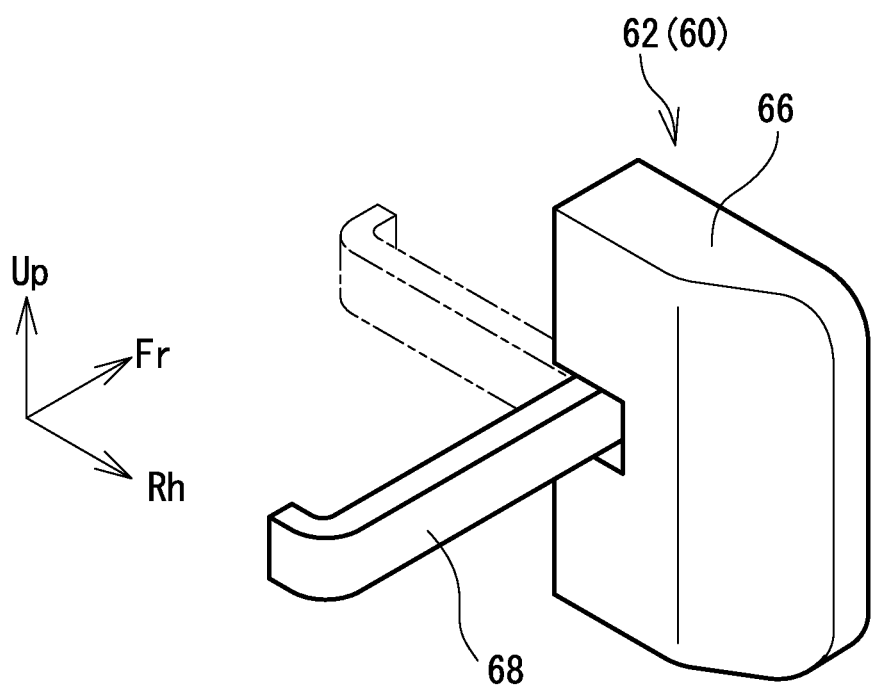
FIG. 8 is a perspective view of an arm-type adapter.
Figure 9:
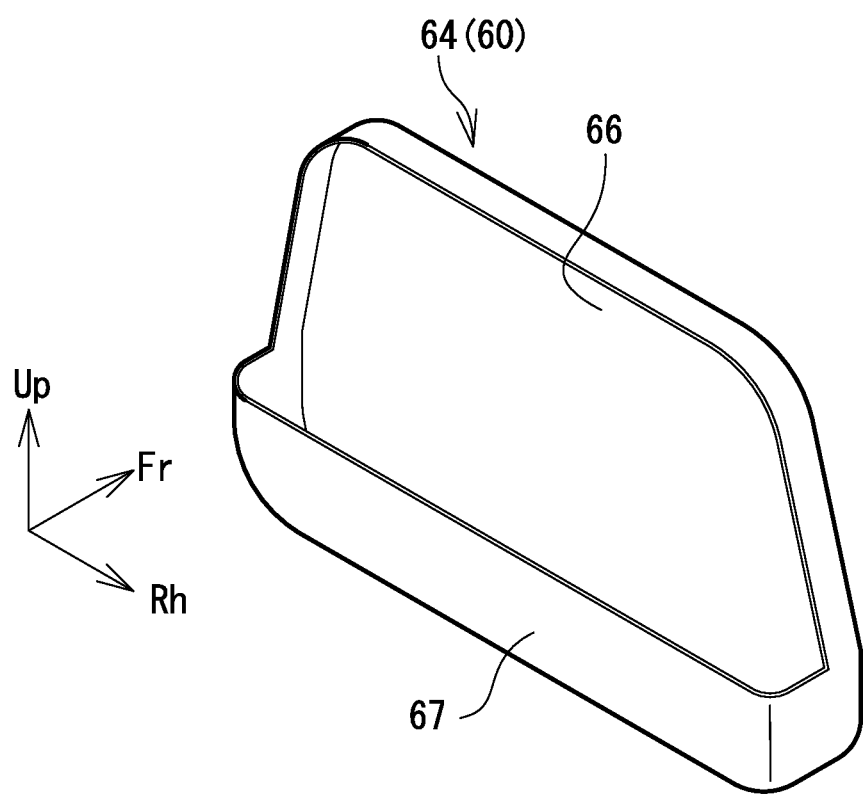
FIG. 9 is a perspective view of a pocket-type adapter.

Next, the adapter 60 to be attached to the base plate 12 will be described. FIG. 7 is a rear view of the seat back table 10 with arm-type adapters 62 attached. FIGS. 8 and 9 are perspective views showing examples of the adapter 60. As described above, the adapter 60 can be attached to the base plate 12. The form of the adapter 60 is not particularly limited, and, for example, the arm-type adapter 62 shown in FIG. 8 and a pocket-type adapter 64 shown in FIG. 9 can be used. The arm-type adapter 62 has a base portion 66 and an arm portion 68, as shown in FIG. 8. The arm portion 68 is a bar-like member elongated in one direction with a slightly bent tip. A base end of the arm portion 68 is connected to the base portion 66 in a swingable manner. The arm portion 68 can be latched at swinging angles in a stepwise manner. Items of various shapes can be held by latching the arm portion 68 at the different swinging angles.

For example, when the arm portion 68 is angled substantially parallel to the base portion 66 as in an arm-type adapter 62a in FIG. 7, a thin plate-like item, such as a smartphone, can be sandwiched between the arm portion 68 and the base plate 12. The arm portion 68 may be latched at an angle substantially orthogonal to the base portion 66 as in an arm-type adapter 62b in FIG. 7. In this case, by combining two arm-type adapters 62b, a thicker item, such as a cup, can be sandwiched between the two arm portions 68.

Figure 10A:
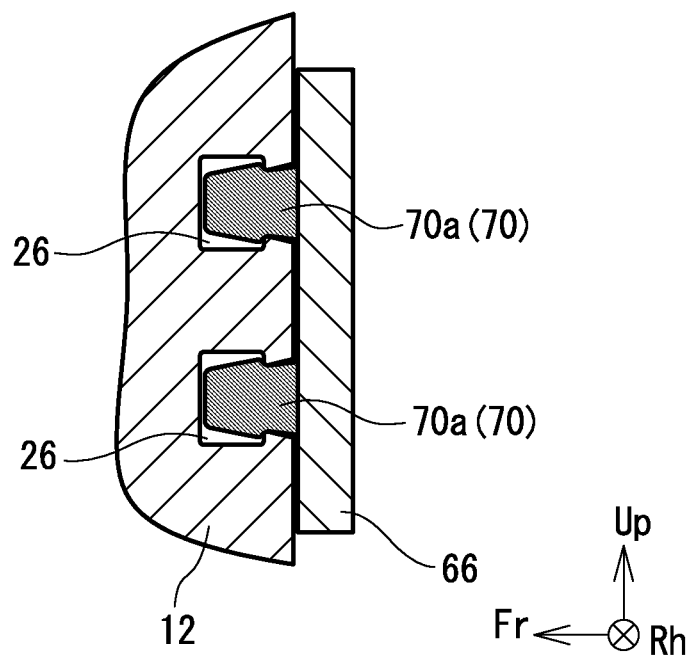
FIG. 10A is a cross-sectional view illustrating an example of a coupling member.
Figure 10B:
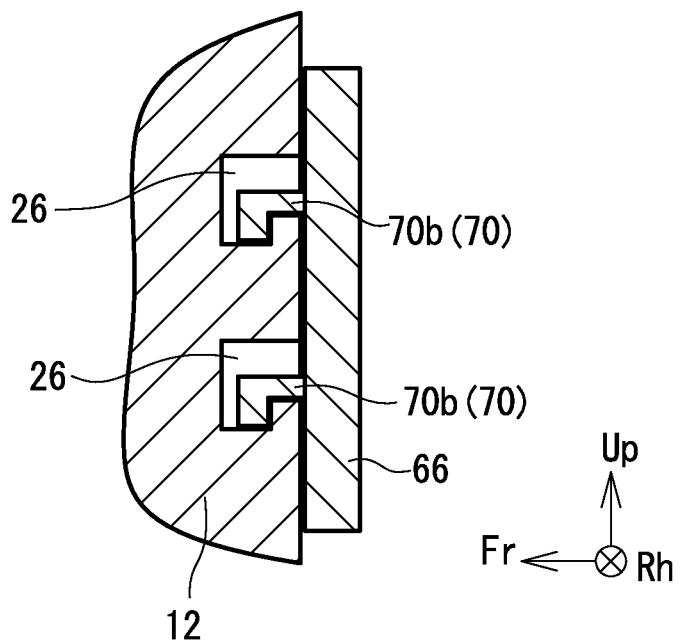
FIG. 10B is a cross-sectional view illustrating another example of a coupling member.

Although not visible in FIGS. 7 and 8, the base portion 66 has, on the rear side, coupling members 70 that are inserted into the rail grooves 26 and connected thereto. The coupling member 70 is not particularly limited as long as it can be attached to and detached from the rail groove 26. For example, the coupling member 70 may be an elastic projection 70a that is made of an elastic material, such as rubber, and protrudes from the rear surface of the base portion 66, as shown in FIG. 10A. In this case, the vertical dimension of the rail groove 26 near an inlet thereof is smaller than the vertical dimension of the elastic projection 70a. By press-fitting the elastic protrusions 70a into these rail grooves 26, the adapter 60 is coupled to the base plate 12. Alternatively, as shown in FIG. 10B, the coupling member 70 may be a generally L-shaped hook 70b that projects from the base portion 66 in the horizontal direction and then extends downward. In this case, the rail groove 26 has a generally L-shaped cross section that is larger than the hook 70b. By inserting the hooks 70b into the rail grooves 26 and engaging them with each other, the adapter 60 is coupled to the base plate 12. In either case, by coupling the coupling members 70 of the adapter 60 to the rail grooves 26 elongated in the right and left direction, a position of the adapter 60 in the right and left direction can be adjusted as desired. As a matter of course, the shapes of the coupling member 70 and the rail groove 26 are not limited to these and may be changed as appropriate. For example, although, in this example, the adapter 60 is attached by using the rail grooves 26, the adapter 60 may be attached without using the rail grooves 26. For example, the adapter 60 may be attached to base plate 12 by magnets.

Alternatively, the pocket-type adapter 64 as shown in FIG. 9 may be used. The pocket-type adapter 64 has the base portion 66 overlapping the surface of the housing recess 24 and a pocket portion 67 projecting from the base portion 66. The base portion 66 has the coupling members 70 as shown in FIGS. 10A and 10B on the rear surface. Such a pocket-type adapter 64 can accommodate even very small items, such as keys and rings, in a stable manner. The configurations of the adapters 60 described so far are merely examples, and various shapes of the adapters 60 may be provided according to items to be held.

In this example, the housing recess 24 is large enough to fully accommodate the adapter 60. This makes it possible to close the table plate 14 with the adapter 60 attached to the base plate 12. The number of times the adapter needs to be attached and detached is therefore reduced, and the convenience of the seat back table 10 is improved.

Figure 11:
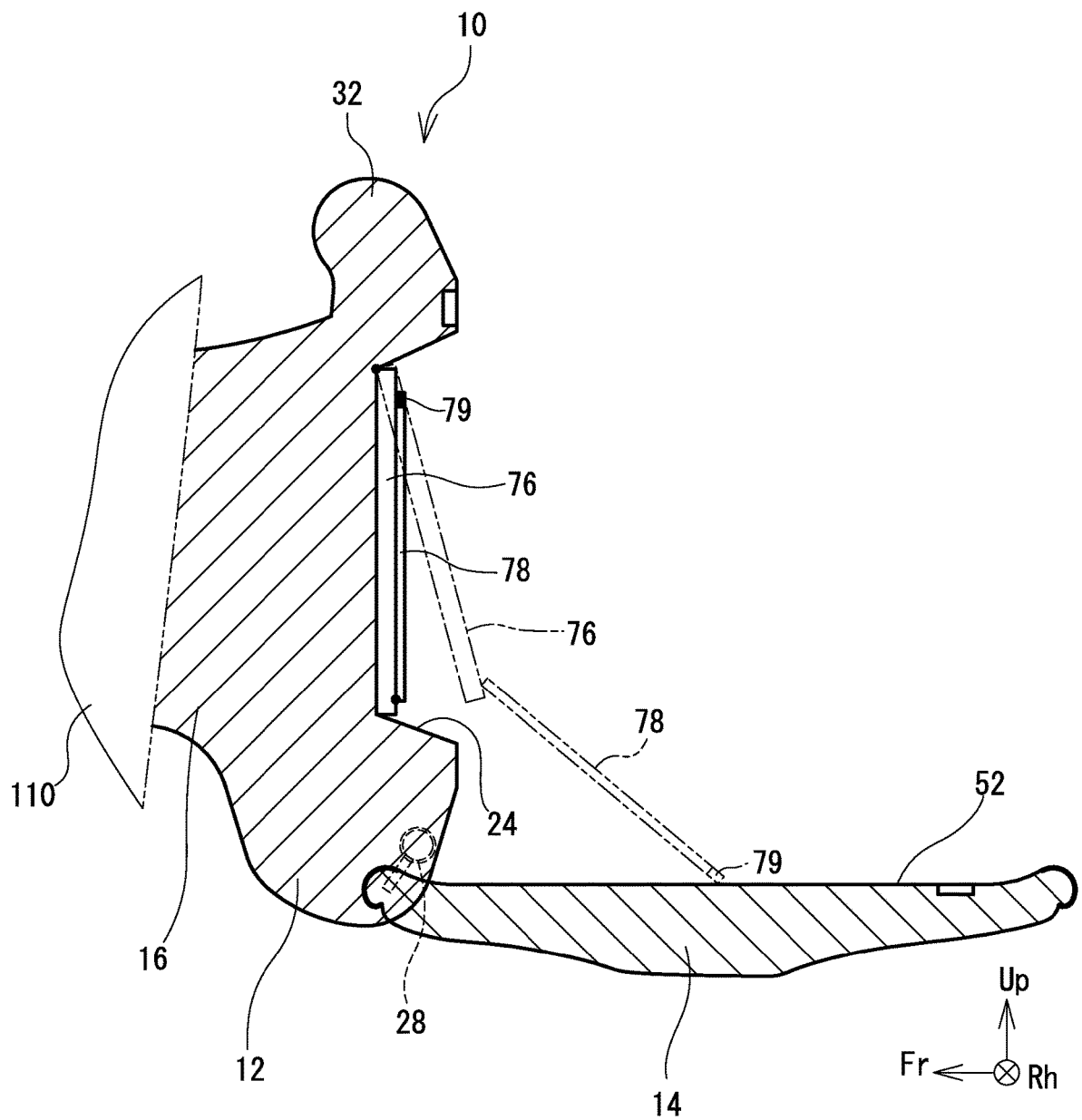
FIG. 11 is a cross-sectional view of another seat back table.

As shown in FIG. 11, instead of the rail grooves 26, a mirror 76 may be provided in the housing recess 24 of the base plate 12. In this case, the tilt of the mirror 76 may be changed as desired. For example, the vicinity of an upper end of the mirror 76 is swingably connected to the housing recess 24, and the vicinity of a lower end of the mirror 76 is swingably connected to a cover 78 for covering the mirror 76. The cover 78 has, on its end opposite to a connected portion (i.e., a free end), a coupling member 79 that couples to any location on the table surface 52. In this case, by pulling the free end of the cover 78 to the near side, the lower end of the mirror 76 can be pulled forward, thereby changing the tilt of the mirror 76 as desired. Once the mirror 76 is adjusted to a desired angle, the coupling member 79 at the free end of the cover 78 is coupled to the table surface 52. Although the configuration of the coupling member 79 is not particularly limited, the coupling member 79 may be, for example, a high-friction member that exerts a high frictional force with the table surface 52. When the table surface 52 has a magnetic body, the coupling member 79 may be a magnet. In either case, the user can easily perform tasks, such as applying makeup, in the vehicle by providing the mirror 76 on the base plate 12.

The configurations described so far are all examples and may be modified as appropriate, provided that the seat back table includes the base plate 12 that is fixed to the rear surface of the seat back 110 and the table plate 14 that is opened and closed by swinging with respect to the base plate 12, and that at least a portion of the peripheral edge of the base plate 12 functions as the grip portion 32. For example, the shape of the base plate 12 and the table plate 14 may be modified as appropriate. For example, they may have a round shape R as shown by a two-dot chain line in FIG. 4, instead of the rounded rectangle shape. The housing recess 24 and the upper surface recess 30 may be omitted.

REFERENCE SIGNS LIST

10 SEAT BACK TABLE, 12 BASE PLATE, 14 TABLE PLATE, 16 FIXING PORTION, 24 HOUSING RECESS, 26 RAIL GROOVE, 28 HINGE, 30 UPPER SURFACE RECESS, 32 GRIP PORTION, 40 MAGNETIC LATCH, 42 MAGNET, 44 MAGNETIC BODY, 50 DECORATED PORTION, 52 TABLE SURFACE, 60 ADAPTER, 62 ARM-TYPE ADAPTER, 64 POCKET-TYPE ADAPTER, 66 BASE PORTION, 67 POCKET PORTION, 68 ARM PORTION, 70 COUPLING MEMBER, 76 MIRROR, 78 COVER, 79 COUPLING MEMBER, 100 IN-VEHICLE SEAT, 110 SEAT BACK.

The invention claimed is:

1. A seat back table attached to a rear surface of a seat back of an in-vehicle seat, the seat back table comprising:
    a base plate fixed to the rear surface of the seat back;
    a table plate that is opened and closed by swinging about a rotational axis that is fixed relative to the base plate; and
    an adapter that is attachable and detachable with respect to the base plate and supports an object when attached to the base plate, wherein:
    a gap to which a fingertip can be inserted is provided between at least a portion of a peripheral edge of the base plate and the seat back,
    at least the portion of the peripheral edge of the base plate functions as a grip portion that is capable of being gripped by a user,
    the base plate has, on a surface facing the table plate, a housing recess which is recessed in a direction of a plate thickness and to which the adapter is attached, and
    the housing recess is large enough to fully accommodate the adapter between the housing recess and the table plate in a closed state where the table plate overlaps the base plate in a thickness direction.

2. A seat back table attached to a rear surface of a seat back of an in-vehicle seat, the seat back table comprising:
    a base plate fixed to the rear surface of the seat back;
    a table plate that is opened and closed by swinging about a rotational axis that is fixed relative to the base plate; and
    a fixing portion that protrudes from the base plate toward the seat back and is fixed to the rear surface of the seat back, wherein:
    a gap to which a fingertip can be inserted is provided between at least a portion of a peripheral edge of the base plate and the seat back,
    at least the portion of the peripheral edge of the base plate functions as a grip portion that is capable of being gripped by a user,
    the fixing portion has an upper edge that is located further downward relative to an upper edge of the base plate, side edges that are located further inward in a vehicle width direction relative to side edges of the base plate, and a thickness that is larger than a thickness of a user's hand, to allow the upper edge, the side edges, and upper corner edges of the base plate to function as the grip portion configured to be held by the user's hand,
    the fixing portion has a recess on an upper surface, and
    the recess is recessed downward from portion in the upper surface on opposite sides of the recess in the vehicle width direction.

* * * * *